United States Patent [19]

Meyer et al.

[11] 4,320,890
[45] Mar. 23, 1982

[54] VALVE SEAT STRUCTURE

[75] Inventors: Danny S. Meyer, Richmond; William S. Shelton, Houston, both of Tex.

[73] Assignee: ACF Industries, Incorporated, New York, N.Y.

[21] Appl. No.: 236,391

[22] Filed: Feb. 20, 1981

[51] Int. Cl.³ ............................................... F16K 3/00
[52] U.S. Cl. .................................. 251/328; 251/167; 251/196
[58] Field of Search ............... 251/159, 167, 172, 196, 251/327, 328

[56] References Cited

U.S. PATENT DOCUMENTS

| | | | |
|---|---|---|---|
| 2,869,819 | 1/1959 | Rucker | 251/328 X |
| 3,067,978 | 12/1962 | Natho | 251/172 |
| 3,809,360 | 5/1974 | Radzhabov | 251/196 |
| 4,124,194 | 11/1978 | Alvarez | 251/159 |
| 4,236,692 | 12/1980 | Williamson | 251/328 |
| 4,246,928 | 1/1981 | Burns | 251/196 X |

*Primary Examiner*—Harold W. Weakley
*Attorney, Agent, or Firm*—Marvin J. Marnock

[57] ABSTRACT

A valve seat structure for an expanding type gate valve (20). A valve seat (64) is received in each annular seat recess (62) formed around the upstream and downstream flow passages (24, 26) and opening to the valve chamber (22) wherein a gate assembly (32) is movable between open and closed positions. An annular face seal (82) is mounted within an annular groove (70) in the front seat face (66) of each valve seat (64). A substantial portion of the bottom (76) of the annular groove (70) comprises a frusto-conical bottom portion (80) which forms a wedging surface with a cone angle in the range of approximately 30° to 60° and disposed substantially coaxial with the groove sides and the flow passages. The rear seal face (86) of the face seal (82) has a frusto-conical rear portion (94) that conforms to the frusto-conical bottom portion (80). The annular groove (70) is wider than the thickness of the face seal (82) so that the face seal loosely fits within the annular groove. The front seal face (84) extends beyond the front seat face (66) a distance in the range between approximately 0.0051 cm and 0.0381 cm when loosely seated in the annular groove. When the gate assembly (32) is expanded to the open or closed positions, the front seal face (84) engages the gate assembly (32) and the annular face seal (82) is axially compressed to effect a seal.

In the closed position, fluid pressure in the upstream flow passage (24) causes the annular seal (82) to wedge against the frusto-conical bottom portion (80) towards the gate assembly.

12 Claims, 8 Drawing Figures

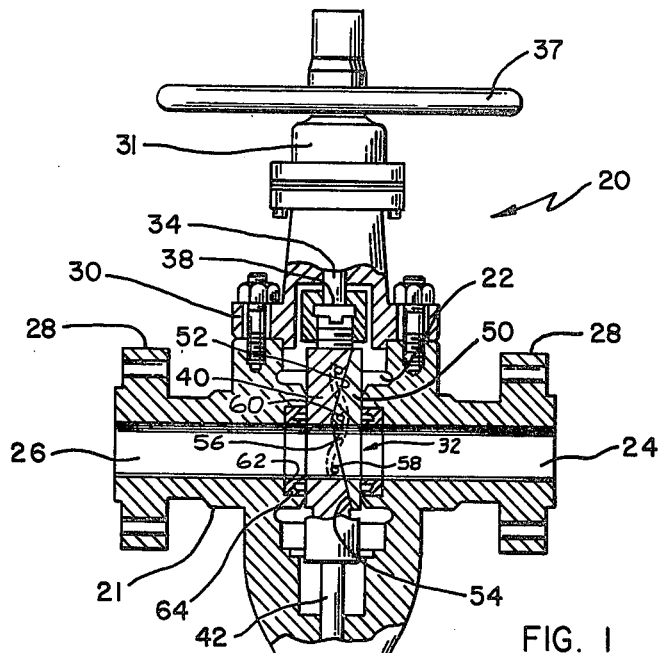
FIG. 1
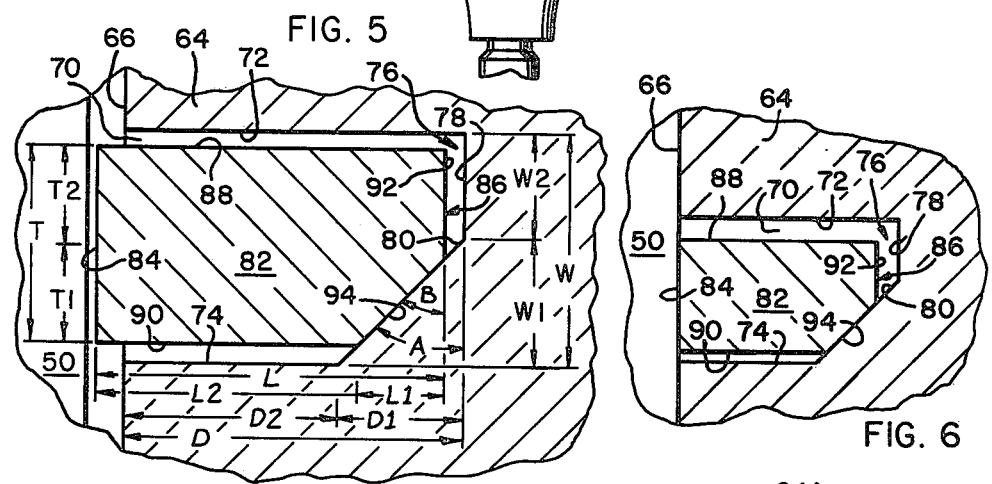
FIG. 5
FIG. 6
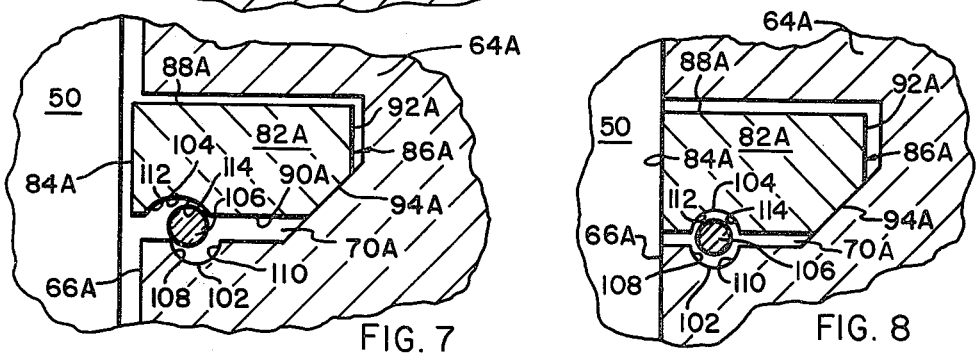
FIG. 7
FIG. 8

Page 1

VALVE SEAT STRUCTURE

BACKGROUND OF THE INVENTION

This invention relates generally to gate valves and more particularly to an improved valve seat structure for expanding gate valves. Heretofore, problems have been experienced with expanding gate valve structures in maintaining the upstream and downstream seat elements in parallel so that the expanding gate assembly can expand and create an effective seal with both of these seat elements. In the higher pressures (greater than 5,000 psi), it becomes extremely difficult to achieve an upstream seal due to the large amount of operating torque required to expand the gate assembly into the upstream seat element. Earlier valve seat structures utilize a plastic insert extending from the front face of the seat element a specified distance so that the plastic insert conforms to the flatness and parallelism of the gate assembly prior to its expansion into metal-to-metal contact against the seat element. However, these plastic inserts have insufficient strength to adequately operate at pressures greater than 5,000 psi. Other earlier structures utilize floating seat elements with front and rear seals which create a pressure energized upstream seal. However, these structures cause the gate assembly to back wedge. In other words, once the gate assembly has collapsed and the gate is in motion, the valve seat structure continues to exert a load or pressure on the segment. When the load overcomes the frictional resistance associated with moving the segment relative to the gate, the segment will wedge up the gate causing the gate assembly to expand prematurely. This is, of course, very undesirable.

In light of these problems, it would be highly desirable to provide an improved valve seat structure that compensates for out-of-parallelism and misalignment between the gate assembly and the upstream valve seat when the gate assembly is in the expanded condition. The valve seat structure of this invention performs this function without tending to cause back wedging of the gate assembly.

SUMMARY OF THE INVENTION

It is an object of the invention to provide an improved valve seat structure that provides an adequate seal between the gate assembly and the upstream valve seat at the time of expansion of the gate assembly into contact with the seat element without causing back wedging of the gate assembly.

The invention is an improved valve seat structure for use in an expanding gate valve. The valve seat is positioned within a annular recess that is about a flow passage that communicates with the valve chamber. The valve seat structure includes an annular seat element mounted in the annular recess having a front seat face adjacent the gate assembly. The front seat face has an annular groove which defines a pair of generally parallel inner and outer groove sides connected by a bottom. The bottom has a flat bottom and a frusto-conical portion with the flat bottom portion nearest to the flow passage and portion extending generally perpendicular to the inner and outer groove sides. The frusto-conical bottom portion which forms at least approximately twenty-five percent (25%) of the width of the bottom is inclined facing the opening of the groove at an angle of between approximately thirty degrees (30°) and approximately sixty degrees (60°) with respect to the flat bottom portion to form a wedging surface.

An annular face seal is movably or loosely received within the annular groove for unrestrained movement therein. The annular face seal has a front seal face extending beyond the front seat face of the seat member outwardly of the groove, and a rear seal face having a frusto-conical rear portion that is in substantially flush contact and in conformity with the frusto-conical bottom portion of the groove. When the gate assembly is expanded, fluid originating from the flow passage is located between the inner seal side and inner groove side and this fluid wedgingly urges the annular face seal towards the gate assembly until its front seal face is pressed tightly against the gate assembly and the frusto-conical rear portion is wedged tightly against the frusto-conical bottom portion of the groove whereby a tight sealing relationship between the gate assembly and the valve seat is formed.

When the gate assembly is collapsed, the annular face seal follows the inward movement of the gate assembly thereby allowing fluid to flow past the frusto-conical rear and bottom portions of the face seal and groove, respectively, to equalize the pressure on both sides of the face seal. Once the pressure is equalized, the face seal moves into a spaced or wiping relationship with the gate assembly.

BRIEF DESCRIPTION OF THE DRAWINGS

FIG. 1 is a sectional view of a balanced stem gate valve structure, a portion shown in elevation, in which is positioned a specific embodiment of the improved valve seat structure;

FIG. 5 is an enlarged fragmentary sectional view of the upstream valve seat structure remote from the handwheel of FIG. 1 with the gate assembly in a collapsed position;

FIG. 6 is an enlarged fragmentary sectional view of the upstream valve seat structure remote from the handwheel of FIG. 1 wherein the gate assembly is fully expanded and under pressure from the flow passage, and a seal is created between the valve seat structure and the gate assembly;

FIG. 7 is an enlarged fragmentary view of the upstream valve seat structure of FIG. 1 remote from the handwheel wherein the annular face seal and annular groove are modified to include a travel limiting assembly, and with the gate assembly in the collapsed position; and FIG. 8 is an enlarged fragmentary sectional view of the upstream valve seat structure of FIG. 1 remote from the handwheel wherein the upstream valve seat structure is modified as in FIG. 7, and with the gate assembly in a fully expanded position and under pressure from the flow passage.

DETAILED DESCRIPTION OF A SPECIFIC EMBODIMENT

Figure 2:
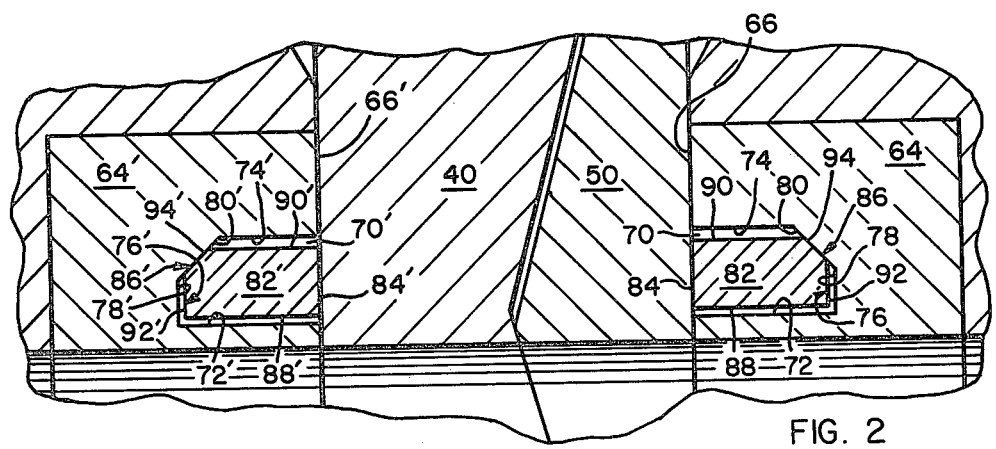
FIG. 2 is an enlarged fragmentary sectional view of the central portion of FIG. 1 with the portions of the upstream and downstream valve seat structures nearest the handwheel shown in an enlarged sectional view with the gate assembly in a fully open position and under pressure from the flow passage.

FIGS. 1-6 illustrate a gate valve structure generally designated as 20. Gate valve structure 20 includes a valve body 21 in which is a valve chamber 22. Valve chamber 22 places the inlet and outlet flow passages 24 and 26 in fluid communication. A pair of flanges 28 are located at the ends of valve body 21 and are utilized to connect the gate valve structure to a flowline in a conventional manner well known to one skilled in the art. A bonnet 30 is bolted to the top of the valve body 21, and a bearing housing 31 is secured to bonnet 30.

An expanding gate valve assembly or gate assembly is generally designated as 32 and is positioned within valve chamber 22 for reciprocal movement between open and closed positions therein generally transverse of the direction of fluid flow through inlet and outlet flow passages 24 and 26. The gate assembly 32 includes a gate 40 located adjacent the downstream or outlet flow passage 26 and a segment 50 located adjacent the upstream or inlet flow passage 24. As is conventional, the gate 40 and segment 50 are each provided with ports therethrough so that when the gate valve is fully open as appears in FIG. 1, the ports are coaxially aligned with the flow passages 24 and 26. An operating stem 34 has the upper end (not illustrated) thereof connected to a handwheel 37, and the lower end 38 thereof connected to the gate 40. A valve stem 42 is connected at its upper end to the bottom end of gate 40 and depends downwardly therefrom. The lower end of valve stem 42 is received in the lower portion of the valve body 21 typically in a sleeve (not shown) as is conventional. A more detailed description of a suitable mounting of operating stem 34 and balancing stem 42 with valve body 21 is provided in U.S. Pat. No. 3,923,285 issued on Dec. 2, 1975, to Diehl et al.

Gate 40 and segment 50 have complementary concave 52 and convex 54 faces, respectively, each of which have wedging surfaces thereon. A spring 56 is anchored at the opposite ends thereof to gate 40 by a pair of retaining lugs 58, and extends over and engages a flexing lug 60 that extends from segment 50. It should be understood that during travel of the gate assembly 32 between its open and closed positions as effected by turning of the handwheel 37 and driving longitudinal movement of the operating stem 34, spring 56 maintains gate assembly 32 in its collapsed position. As gate assembly 32 reaches either its open or closed position, segment 50 encounters valve body 21 and is rendered immovable. Gate 40 then moves relative to segment 50 and rides the wedging surface of convex face 54 so that gate 40 and segment 50 laterally expand apart from each other. When gate assembly 32 is displaced from its fully expanded position, spring 56 facilitates the immediate collapse of gate 40 and segment 50 into their collapsed position.

As will become apparent from the following discussion, the valve seat structure of this invention provides operating characteristics heretofore unavailable in expanding gate valves, and particularly in expanding gate valves operating at pressures greater than 5,000 psi. The following description of the valve seat structure will not differentiate between the upstream and downstream members. However, the description of the operation of the invention will differentiate between the upstream (unprimed) and downstream (primed) members.

An annular recess 62 is formed in the valve body 21 about the inlet and outlet flow passages 24 and 26 adjacent valve chamber 22. An annular metallic seat element 64 is fitted within annular recess 62. Annular metallic seat element 64 has a front seat face 66 in which is formed an annular groove 70 which is defined by generally parallel inner and outer groove sides 72 and 74 that are joined by a bottom 76. Annular groove 70 has a width "W" measured between the inner and outer groove sides, and a depth "D" measured between front seat face 66 and bottom 76. The depth "D" of groove 70 is preferably around one and one-half (1½) times greater than width "W". Depth "D" between approximately one and one-fourth (1-¼) and one and three-fourths (1¾) times greater than width "W" would function effectively.

Bottom 76 includes a flat bottom portion 78 that is generally perpendicular to and adjacent to inner groove side 72 which is the side nearest the flow passage, and a frusto-conical bottom portion 80 that is formed adjacent to outer groove side 74. Frusto-conical bottom portion 80 comprises between approximately twenty-five percent (25%) and approximately seventy percent (70%) of the width "W" of annular groove 70 (this dimension is shown as "W1"), and between approximately twenty percent (20%) and approximately fifty percent (50%) of the depth "D" of annular groove 70 along outer groove side 74 (this dimension is shown as "D1"). The dimension of flat bottom portion 78 is represented by the designation "W2". The dimension of outer groove side 74 is represented by the designation "D2". Frusto-conical bottom portion 80 is disposed from flat bottom portion 78 at an angle "A" which is within a range of between approximately thirty degrees (30°) and approximately sixty degrees (60°).

An annular face seal 82 is positioned or loosely received in annular groove 70 for relatively unrestrained movement therein. Annular face seal 82 includes opposite front and rear seal faces 84 and 86 joined together by inner and outer seal sides 88 and 90. Annular face seal 82 is of a thickness "T" as measured between the inner and outer seal sides, and is of a length "L" as measured between the front and rear seal faces. The length "L" of face seal 82 is between approximately 1.4 and 1.6 times the thickness "T" thereof. Rear seal face 86 includes a flat rear portion 92 that is generally perpendicular and adjacent to inner seal side 88, and a frusto-conical rear portion 94 that is formed adjacent to outer seal side 90. Frusto-conical rear portion 94 comprises between approximately twenty-five percent (25%) and approximately seventy percent (70%) of the thickness of annular face seal 82 (this dimension is shown as "T1"), and between approximately twenty percent (20%) and approximately fifty percent (50%) of the length of annular face seal 82 along its outer seal side 90 (this dimension is shown as "L1"). The dimension of flat rear portion 92 of rear seal face 86 is represented by the designation "T2". The dimension of outer seal side 90 is represented by the designation "L2". Frusto-conical rear portion 94 is disposed from flat rear portion 92 at an angle "B" which is within a range of between approximately thirty degrees (30°) and approximately sixty degrees (60°). For expanding gate valves of standard commercial sizes, front seal face 84, when the gate is in the collapsed condition, extends past front seat face 66 a distance "E" which is within a range of between approximately 0.002 inches (0.0051 cm) and approximately 0.015 inches (0.0381 cm).

The dimensions of a specific embodiment of the valve seat structure in a 2 and 9/16th inch (6.51 cm) 20,000 psi expanding gate valve are set forth below; however, it is intended that the recitation of a particular size of valve or the dimensions are not limiting as to the scope of applicants' invention:

W = 0.130 inches (0.331 cm)
W1 = 0.06 inches (0.152 cm)
W2 = 0.07 inches (0.178 cm)
D = 0.181 inches (0.46 cm)
D1 = 0.06 inches (0.152 cm)
D2 = 0.121 inches (0.308 cm)
T = 0.120 inches (0.304 cm)
T1 = 0.055 inches (0.14 cm)
T2 = 0.065 inches (0.165 cm)
L = 0.190 inches (0.483 cm)
L1 = 0.076 inches (0.193 cm)
L2 = 0.114 inches (0.29 cm)
A = 45° = B
E = 0.006 inches (0.0152 cm)

With the face seal 82 sitting loosely in the annular groove 70 with its frusto-conical surface engaging the frusto-conical bottom surface of the groove, the clearance between groove side 74 and seal side 90 is in the range of 0.001 inches to 0.015 inches. Clearance between seal side 88 and groove side 72 is 0.021 inches, and preferably in the range of "E"+0.015 inches. It is the same clearance as between the rear seal face 92 and groove bottom 78.

The face seal 82 may be of a resilient plastic material, such as Teflon, but for operating at high temperatures greater than 500° F. (260° C.) or at high pressures greater than 10,000 psi, a metallic face seal is required. In such instances, an aluminum bronze alloy or a soft stainless steel, such as 316 stainless steel, would be a suitable material.

FIG. 5 illustrates the valve seat structure of the invention when gate assembly 32 is in its collapsed position for longitudinal travel within valve chamber 22. The fluid pressure on inner seal side 88 and outer seal side 90 is equal so that both the upstream and downstream annular face seals (only the upstream face seal is illustrated in FIG. 5) are in a wiping relationship with gate assembly 32. When in this wiping relationship with gate assembly 32, front seal face 84 is spaced apart a small distance from the gate assembly so as to provide a beneficial wiping of the adjacent surface of the collapsed gate assembly 32 which reduces the amount of contaminants that enter valve chamber 22. When in this wiping relation, annular face seal 82 does not impede or bind the movement of gate assembly 32 within valve chamber 22 since its inward movement of float is limited by frusto-conical rear portion 94 reaching its end of travel in frusto-conical bottom portion 80. In this wiping relation, while the spacing between front face seal 84 and gate assembly 32 may vary with the size of the valve, for expanding gate valves of standard commercial sizes it is generally approximately 0.020 inches (0.051 cm).

Figure 3:
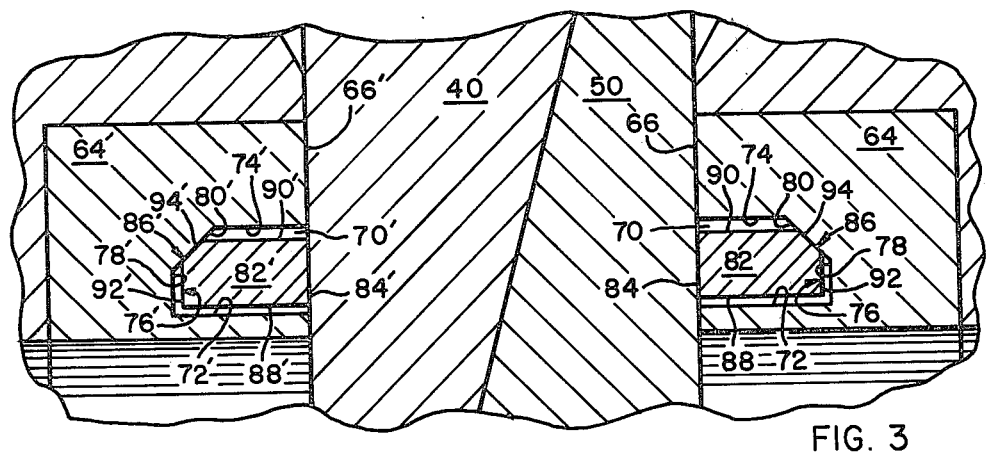
FIG. 3 is an enlarged fragmentary sectional view of the central portion of FIG. 1 with the portions of the upstream and downstream valve seat structures nearest the handwheel shown in an enlarged sectional view with the gate assembly in a fully closed position and under pressure from the flow passage.

FIG. 3 illustrates the gate assembly in its closed position. As gate assembly 32 reaches its closed position, it expands against both upstream and downstream annular face seals 82 and 82' so that they are axially compressed to form a fluid-tight seal between themselves and gate assembly 32 and their respective annular grooves 70 and 70'. With respect to upstream annular face seal 82, fluid from inlet flow passage 24 then travels along the upstream side of segment 50 and into upstream annular groove 70, and is contained within a space between inner groove side 72 and inner seal side 88. The fluid does not leak past either the front or rear seal faces of annular face seal 82 due to the above described seal created between it and gate assembly 32 and upstream annular groove 70. As the fluid pressure builds within the space between the outer groove and seal sides, upstream annular face seal element 82 is forced to travel on its frusto-conical rear portion 94 up frusto-conical bottom portion 80. As upstream annular face seal 82 travels up frusto-conical bottom portion 80, it moves inwardly towards gate assembly 32 while gate assembly 32 simultaneously expands outwardly towards it. Fluid pressure built up in the space defined between flat bottom portion 78 and flat rear portion 92 also forces upstream annular face seal 82 to travel inwardly toward valve chamber 22 and gate assembly 32. Thus, an effective seal which surrounds the flow passage is created between front seal face 84 and gate assembly 32, and between frusto-conical rear portion 94 and annular groove 70. Because fluid from the flowline actually forces the upstream annular face seal to wedge towards the gate assembly, the effectiveness of the seal created by the annular face seal increases with increasing flow passage fluid pressure. The inward travel of the annular face seal towards the gate assembly reduces the distance the gate assembly must move against the direction of fluid flow in the flow passage. It can thus be seen that the ability of annular face seal 82 to move inwardly in response to fluid pressure in the flow passage facilitates the formation of an effective seal on the upstream side of gate assembly 32 without the need for exerting operating torques on the gate assembly of such degrees as has been required in the past.

With respect to the downstream annular face seal 82', when the gate assembly is placed in its closed position, the downstream annular face seal remains slightly axially compressed between frusto-conical bottom portion 80' of downstream annular groove 70' due to the expansion of gate assembly 32. However, because fluid does not flow into downstream annular recess 70', downstream annular face seal 82' does not wedge inwardly towards valve chamber 22.

FIG. 2 illustrates the gate assembly in its open position in which it is also fully expanded and the ports through gate 40 and segment 50 are fully aligned. As gate assembly 32 reaches its open position, both the upstream and downstream annular face seals 82 and 82' are axially compressed to initially seal against gate assembly 32 and their respective annular grooves 70 and 70' in a manner similar to that when the gate assembly reaches its closed position. However, because fluid from the flow passage has entered the valve chamber during the movement of the gate assembly the fluid pressure on both sides of the upstream and downstream annular face seals is equal, and the upstream and downstream annular face seals are not axially compressed any further by wedging inwardly towards valve chamber 22.

Figure 4:
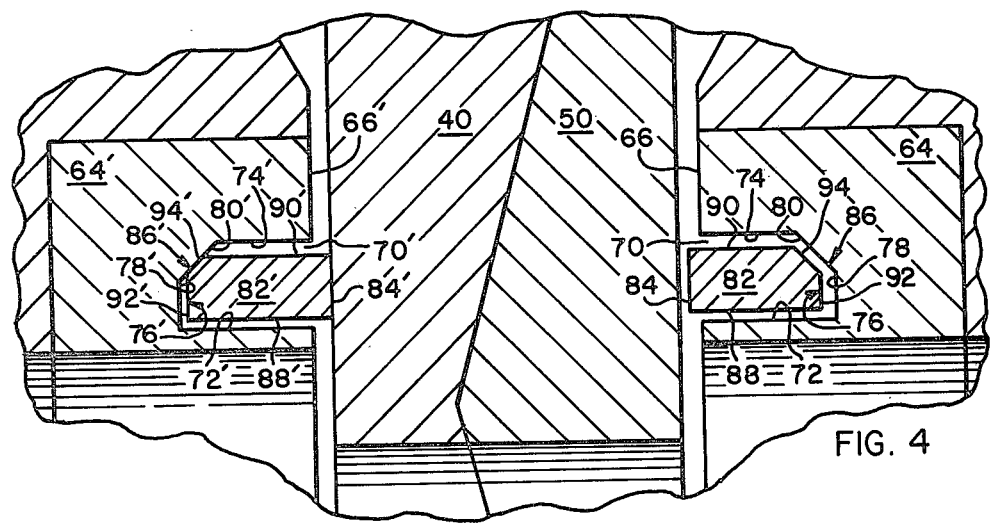
FIG. 4 is an enlarged fragmentary sectional view of the central portion of FIG. 1 with the portions of the upstream and downstream valve seat structures nearest the handwheel shown in an enlarged sectional view with the gate assembly moving from the closed position towards the fully open position and having just reached a collapsed position with the annular face seal having followed the collapse of the gate assembly towards the center of the valve chamber.

Referring to FIG. 4, when gate assembly 32 is in longitudinal movement towards the fully open position and just collapses from its closed position, front seal face 84 of upstream annular face seal 82 continues to contact gate assembly 32 and follows gate assembly 32 inwardly towards valve chamber 22. As a result of this, frusto-conical rear portion 94 of upstream annular face seal 82 moves away from frusto-conical bottom portion 80 of upstream annular groove 70, and fluid contained between the inner sides and flat portions of upstream annular groove 70 and upstream annular face seal 82 flows past these frusto-conical rear and bottom portions 94 and 80 to the outer sides of upstream annular groove 70 and upstream annular face seal 82 thereby equalizing the fluid pressure on both sides of upstream annular face seal 82. Once the fluid pressure on both sides of upstream annular face seal 82 is equalized, it moves back into its wiping relationship with the gate assembly as illustrated in FIG. 5.

FIGS. 7 and 8 illustrate a modified embodiment of the specific embodiment illustrated in FIGS. 1-6. The embodiment illustrated in FIGS. 7 and 8 is dimensionally and operatively similar to that illustrated in FIGS. 1-6 with the exception of the addition of a travel limitation assembly generally designated at 100. It is particularly suited for large bore valves or valves utilized in high velocity flow conditions where the face seal might otherwise be severely flexed. In this embodiment an annular groove recess 102 is contained within annular groove 70A in seat element 64A and is in an opposed facing relationship with an annular seal recess 104 formed in annular face seal 82A. Annular groove recess 102 has forward and rearward sides 108 and 110, and annular seal recess 104 has forward and rearward sides 112 and 114. An annular ring 106 or stop member is fitted within annular groove recess 102 and extends into annular seal recess 104. The annular ring is made of a hard metal, such as stainless steel or Inconel.

The annular groove 70A and seal recesses 102, 104 are dimensioned relative to annular ring 106 such that the movement of annular face seal 82A inwardly toward the gate assembly and valve chamber 22A is limited by interference between annular ring 106 and rearward surface 114 of annular seal recess 104 and forward surface 108 of annular groove recess 102. This inward travel is limited such that when the fluid pressure on both sides of face seal 82A is equalized, the distance the annular face seal moves toward the valve chamber is limited to that distance wherein the annular face seal is in its wiping relationship with the gate assembly. However, when the gate assembly first collapses, the face seal is permitted to travel a sufficient distance to allow the fluid pressure on both sides thereof to become equalized. In no case does the face seal extend such a distance to cause a back wedging of the gate assembly.

The valve seat structure of the invention is also useful in a double block and bleed gate valve application. In this type of application, pressurized fluid is applied to both sides of the gate assembly. Consequently, when the gate assembly is closed, the annular face seals 82 and 82' on both sides of the gate assembly act like the upstream face seal described above to form pressure energized seals on both sides of the gate assembly.

It will therefore be seen that a new and improved valve seat structure for expanding type gate valves is disclosed herein. In particular, it is very effective for achieving an upstream seal in the higher pressures (greater than 5,000 psi) without requiring a large amount of operating torque to expand the gate assembly into the upstream seat element. It is also adaptable to operation at these higher pressures in high temperature environments greater than 500° F. (260° C.).

The foregoing description of the invention has been presented for purposes of illustration and explanation and is not intended to limit the invention to the precise form disclosed as changes in details of the illustrated construction may be made by those skilled in the art, within the scope of the appended claims, without departing from the spirit of the invention. For example, the flat bottom portion 78 of the annular groove 70 could be made very small or eliminated and the flat rear portion 92 of the annular face seal 82 made correspondingly small or reduced to the form of a rounded edge. It is intended that the scope of the invention be defined by the claims appended hereto.

What is claimed is:

1. In an expanding gate valve structure having a valve body with a valve chamber therein, inlet and outlet flow passages communicating with the valve chamber and an annular recess about each flow passage, and a gate assembly including a gate element and segment slidably mounted within the valve chamber for movement between open and closed positions with said gate element and segment expanding away from each other at the open and closed positions, an improved valve seat structure mounted within each annular recess, said improved valve seat structure comprising:

an annular seat element having a front seat face and mounted in the annular recess with the front seat face disposed adjacent the gate assembly, said front seat face having an annular groove therein with said annular groove defining an inner groove side nearest the flow passage and an outer groove side further from the flow passage and a bottom joining said inner and outer groove sides, said bottom having a flat bottom portion extending generally perpendicularly from said inner groove side and a frusto-conical portion facing said inner groove side and joining said flat bottom portion and said outer groove side at an inclined angle to thereby form a wedging surface; and an annular face seal loosely received within said annular groove and having front and rear seal faces joined by generally parallel inner and outer cylindrical seal sides, said rear seal face having a flat rear surface portion adjoining said inner seal side and a frusto-conical rear surface portion joining the outer seal side and said flat rear surface portion at angles conforming to the respective angles of inclination of the frusto-conical bottom portion with the outer groove side and flat bottom portion of the groove, said annular face seal having a length dimension between said front and rear seal faces which exceeds the depth of said annular groove such that the front seal face extends beyond the front seat face into the valve chamber when said annular face seal is loosely seated in the groove with their frusto-conical surfaces in contact and the gate assembly in a collapsed condition with fluid pressures on both sides of the face seal being equal whereby the expansion of the gate assembly when in its open and closed positions effects an axial compression circumferentially about each annular face seal on both the upstream and downstream sides of the gate assembly and further, when in the closed position, the annular face seal on the upstream side is urged against the wedging frusto-conical groove bottom towards the gate assembly by fluid pressure in said flow passage to effect a tight seal thereagainst which increases with increasing fluid pressure in the flow passage.

2. In an expanding gate valve, an improved valve seat structure as set forth in claim 1 wherein said annular seat element is metallic.

3. In an expanding gate valve, an improved valve seat structure as set forth in claim 1 wherein when the gate assembly is in the collapsed condition said front seal face extends past said front seat face a distance "E" within the range of approximately 0.002 inches (0.0051 cm) and 0.015 inches (0.0381 cm).

4. In an expanding gate valve, an improved valve seat structure as set forth in claim 3 wherein when the gate assembly collapses said annular face seal follows the gate assembly inwardly towards the valve chamber and fluid from the flow passage flows between the frusto-conical rear portion and frusto-conical bottom portion to equalize fluid pressure on said annular seal sides, in which condition the inner diameter of said annular face seal exceeds the diameter of said inner groove side to provide a clearance between said inner seal side and the inner groove side in the range of 0.001 inches to 0.015 inches and the clearance between said outer seal side and outer groove side is in the range of "E" plus 0.015 inches.

5. In an expanding gate valve, the improved valve seat structure of claim 1 wherein said frusto-conical bottom portion forms between approximately twenty-five percent and approximately seventy percent of a width of said bottom, and said frusto-conical rear portion forms between approximately twenty-five percent and approximately seventy percent of a width of said rear seal face.

6. In an expanding gate valve, the improved valve seat structure of claim 1 wherein said frusto-conical bottom portion forms between approximately twenty percent and fifty percent of a depth of said outer groove side.

7. In an expanding gate valve, the improved valve seat structure of claim 1 wherein said annular face seal is of polytetrafluoroethylene material.

8. In an expanding gate valve, the improved valve seat structure of claim 1 wherein said annular face seal is between approximately 1.4 times and approximately 1.6 times as long as it is wide.

9. In an expanding gate valve structure having a valve body with inlet and outlet flow passages communicating with a valve chamber therein and an annular recess about each flow passage adjacent the valve chamber, and a gate assembly mounted in said valve chamber for movement in a collapsed condition between open and closed positions and including a gate and a segment carried thereby disposed in an expanded condition away from each other at the open and closed positions; and improved valve seat structure mounted within each annular recess, said improved valve seat structure comprising:

an annular metallic seat member mounted in each recess and having a front seat face sealingly engageable with said gate assembly, said front seat face having an annular groove therein with said annular groove defining a pair of generally parallel and cylindrical groove sides comprising an inner groove side and an outer groove side and a groove bottom joining said inner and outer groove sides, said groove bottom having a frusto-conical bottom portion facing said inner groove side and joining said outer groove side, said frusto-conical bottom portion having a cone angle from about thirty degrees to sixty degrees and disposed coaxial with said inner and outer groove sides; and an annular face seal loosely received within said annular groove and having front and rear seal faces joined by generally parallel inner and outer cylindrical seal sides, said rear seal face having a frusto-conical rear portion extending from said outer seal side and disposed coaxially with said cylindrical seal sides, said frusto-conical rear portion having a cone angle conforming to said frusto-conical bottom portion, and said annular face seal having a length dimension between its front and rear seal faces which exceeds the depth of said annular groove such that said front seal face extends from said annular groove beyond the front seat face when loosely seated in the groove with its gate assembly in the collapsed condition whereby expansion of the gate assembly to the open or closed position effects an axial compression of the annular face seal in each annular recess and in the closed position fluid pressure in the flow passage on the upstream side urges the annular seal on the upstream side against the frusto-conical bottom portion in a wedging movement toward the gate assembly to effect a tight seal therewith which increases with increasing fluid pressure.

10. In an expanding gate valve, the improved valve seat structure of claim 9 further comprising a limiting means, contained within said annular groove and said annular face seal, for limiting travel of said annular face seal inwardly towards the valve chamber.

11. In an expanding gate valve, the improved valve seat structure of claim 10 wherein said limiting means includes:

oppositely facing annular groove and seal recesses in said outer groove side and outer seal side, respectively, and a stop member movably contained within said annular groove and seal recesses, said stop member, said annular groove and said annular seal recesses dimensioned so that travel of said annular face seal towards the valve chamber is limited by interference between said stop member, said annular groove recess, and said annular seal recess to a distance wherein said front seal face is spaced apart from the gate assembly.

12. In an expanding gate valve, the improved valve seat structure of claim 9 wherein said annular face seal is of metallic material.

* * * * *